(12) United States Patent
Tripathi et al.

(10) Patent No.: US 7,974,194 B2
(45) Date of Patent: Jul. 5, 2011

(54) OPTIMIZING DATA TRAFFIC AND POWER CONSUMPTION IN MOBILE UNIFIED COMMUNICATION APPLICATIONS

(75) Inventors: Ashutosh Tripathi, Hyderabad (IN); Bala Rajagopalan, Hyderabad (IN); Madhur Dixit, Hyderabad (IN); Rahul Singh, Hyderabad (IN); Srinivasa Manda, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 12/333,821

(22) Filed: Dec. 12, 2008

(65) Prior Publication Data

US 2010/0149975 A1  Jun. 17, 2010

(51) Int. Cl.
*G08C 15/00* (2006.01)
*H04H 20/71* (2008.01)

(52) U.S. Cl. ........................................ 370/230; 370/312
(58) Field of Classification Search .................. None
See application file for complete search history.

(56) References Cited

U.S. PATENT DOCUMENTS

| | | | |
|---|---|---|---|
| 7,228,330 B2 | 6/2007 | Vignaud | |
| 7,283,805 B2 | 10/2007 | Agrawal | |
| 2002/0083183 A1* | 6/2002 | Pujare et al. | 709/231 |
| 2004/0039504 A1* | 2/2004 | Coffee et al. | 701/35 |
| 2007/0060114 A1* | 3/2007 | Ramer et al. | 455/418 |
| 2007/0149184 A1* | 6/2007 | Viegers et al. | 455/422.1 |
| 2007/0192490 A1 | 8/2007 | Minhas | |
| 2008/0020775 A1* | 1/2008 | Willars | 455/445 |
| 2008/0059582 A1 | 3/2008 | Hartikainen et al. | |
| 2008/0233962 A1 | 9/2008 | Hazra et al. | |

FOREIGN PATENT DOCUMENTS

| | | |
|---|---|---|
| WO | 2005071907 A1 | 8/2005 |
| WO | 2008102265 A2 | 8/2008 |

OTHER PUBLICATIONS

Rosenberg et al., IETF RFC 3261, Jun. 2002, p. 1, 17, 27, 35, 50.*
Vollers, Chip, "Anywhere Access and Mobile Security", Retrieved at <<http://technet.microsoft.com/en-us/library/cc512647.aspx>>, Nov. 14, 2007, pp. 1-3.
Shiu, et al., "Low Power Consumption Solutions for Instant Messaging on Mobile Devices", Retrieved at <<http://ieeexplore.ieee.org/stamp/stamp.jsp?arnumber=4526160&isnumber=4525556>>, 2008 IEEE, Oct. 7, 2008, pp. 2764-2768.
Shan, Xueshan, "A Presence-Enabled Mobile Service System for Integrating Mobile Devices with Enterprise Collaborative Environment", Retrieved at <<http://www.ctr.kcl.ac.uk/IWWAN2005/papers/9.pdf>>, pp. 6.

* cited by examiner

*Primary Examiner* — Jianye Wu
(74) *Attorney, Agent, or Firm* — Turk IP Law, LLC (57) ABSTRACT

Data traffic, latency, and power consumption in a mobile unified communication environment are reduced by optimizing communication between a mobile client application and a mobile data server through determining optimum delay between exchanged messages and/or filtering portions of data not relevant to the mobile client application at the server. Additional optimizations include providing mobile client application relevant updates in an intelligent fashion based on user activity, screen resolution or displayed information, relevant contacts and relevance of information, and similar characteristics.

20 Claims, 9 Drawing Sheets

OPTIMIZING DATA TRAFFIC AND POWER CONSUMPTION IN MOBILE UNIFIED COMMUNICATION APPLICATIONS

BACKGROUND

The proliferation of capabilities and services provided through communication devices by newer systems combine a variety of short range and long range communication capabilities over a number of networks including traditional phone networks, wireless networks, and similar ones. Telecommunication end devices as well as support devices and programs for such newer systems are more similar to computer networks than conventional telephone networks. Thus, a large number of capabilities may be added to those already provided by modern telecommunication devices and networks. Some of those services may be provided through smart phones working on cellular networks or other limited bandwidth networks.

For example, enterprise messaging and voice communication applications running on a mobile phone may enable a user to retrieve his/her enterprise contact list, get presence and availability information for his/her contacts, search the corporate directory, initiate and receive instant messages (IM) and voice calls to/from contacts. Such applications rely on wireless data connection from the mobile phone to an enterprise server to perform their functions. In particular, presence and availability information, and IM/call notifications may arrive at any time, and the data connectivity may have to be "always-on" to be able to deliver the data to the mobile phone. Continuous connectivity and a steady stream of presence updates may impose a significant processing load on the mobile phone and consume it limited power source quickly. For instance, a typical "always-on" implementation may require the mobile application to poll the server frequently. Similarly, a typical presence updating scheme is to a send presence update to the client as soon as it arrives at the server.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimizing data traffic, power consumption and latency pertaining to the operation of mobile communication applications. According to some embodiments, data traffic and power consumption may be reduced by optimizing communication between a client and a server through determining optimum delay between exchanged messages and filtering data at the server. According to other embodiments, client application may receive relevant updates in an intelligent fashion based on user activity, screen resolution or displayed information, relevant contacts and relevance of information, and similar characteristics.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, data traffic and power consumption may be optimized by determining optimum delay between messages exchanged between a mobile client and a server, filtering data at the server, providing update data based on user activity, or relevance of the updates as determined by the client application. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing traffic related data. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
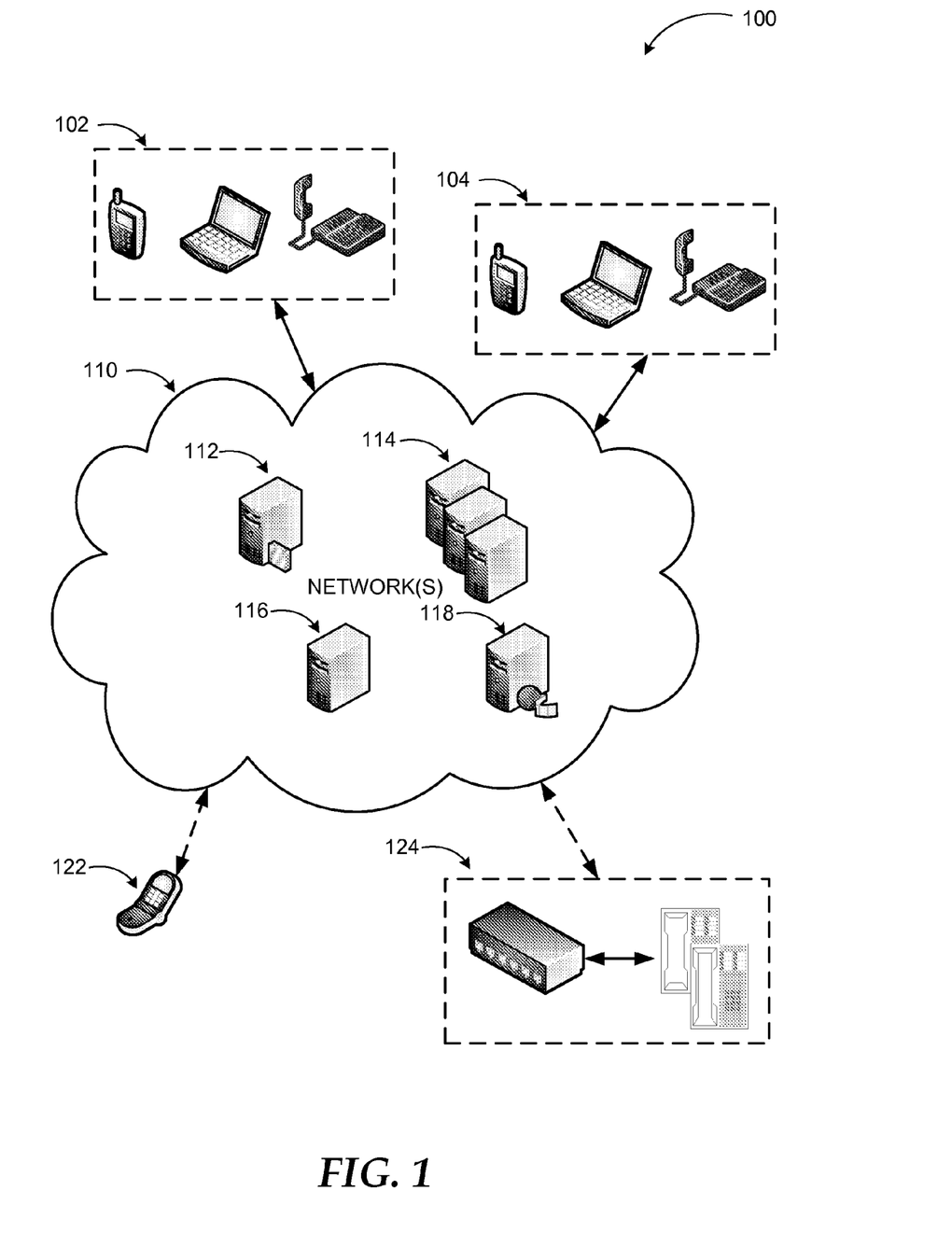
FIG. 1 is a diagram illustrating an example unified communications system.

Referring to FIG. 1, diagram 100 of an example unified communications system is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-to-Back User Agent "B2BUA").

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

One of the servers described above or a separate server may be responsible for managing communication specifically with mobile clients such as providing presence data updates pertaining to other subscribers. Presence information may include a wide range of data associated with each subscriber such as their location, availability, contact information details, alternative contacts, organizational information, and comparable data. Other data such as calendar information associated with a subscriber may also be provided to client applications through the mobile server. Thus, the mobile server may have to provide significant amount of data frequently based on how quickly the presence information pertaining to the subscribers' changes.

While the example system in FIG. 1 has been described with specific components such as mediation server, A/V server, and similar devices, embodiments are not limited to these components or system configurations and can be implemented with other system configuration employing fewer or additional components. Functionality of systems optimizing mobile client-server data exchange may also be distributed among the components of the systems differently depending on component capabilities and system configurations.

Figure 2:
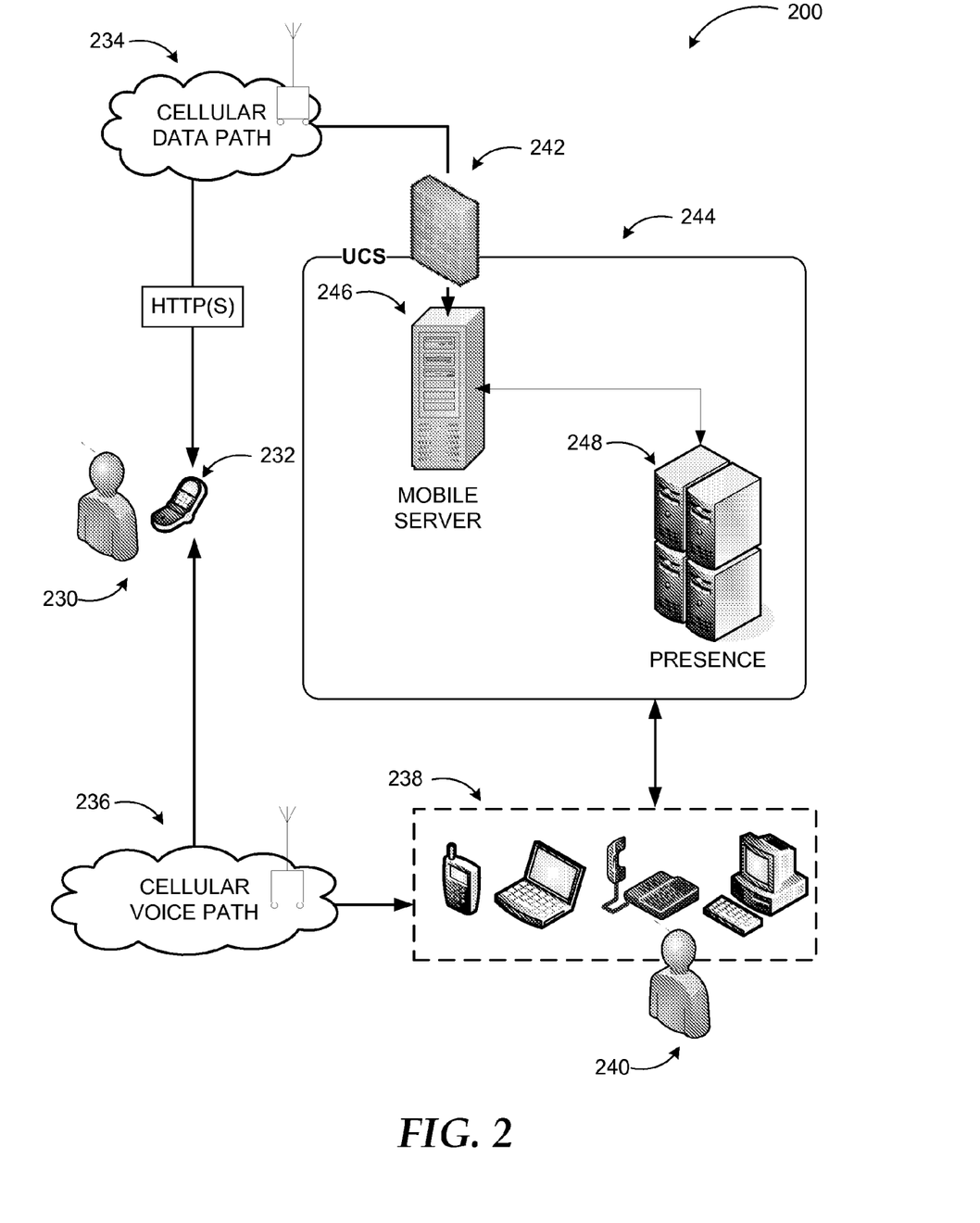
FIG. 2 illustrates an example system where mobile communication may be optimized according some embodiments.

FIG. 2 illustrates an example system 200 where mobile communication may be optimized according some embodiments. While a system according to embodiments is likely to include many—if not all—of the components of a UC system discussed in FIG. 1 and additional ones, only those relevant to embodiments are shown in FIG. 2. Thus, Unified Communication System (UCS) 244 is illustrated with one or more presence servers 248, mobile server 246, and a firewall 242. Mobile server 246 acts as a front end to the client application(s) running in mobile devices such as smart cellular phone 232 and hides the details of the mobile access operations from the core network communication server(s). Thus, utilizing mobile server 246, UCS communications are processed in a transparent manner without having to modify system-wide operations for mobile client applications. Mobile client application may utilize any communication protocol such as the HTTP(S) protocol to connect to the mobile server 246. The mobile server in turn may utilize appropriate methods to communicate with the UC server(s) (for example, Session Initiation Protocol "SIP"). Firewall 242 provides security between the core UC network operations and outside connections such as data exchange with smart cellular phone 232 over cellular data path 234.

Since limited bandwidth environments like cellular networks are particularly suitable for the optimizations according to embodiments, system 200 illustrates mobile device operations for voice and data based communications over cellular networks. Thus, data exchange may be performed over cellular data path 234 with the UCS 244 while voice communications may be performed over cellular voice path 236 with other communication devices 238.

As mentioned previously, users may utilize a variety of communication devices with different capabilities in a UC system. The enhanced services provided by such devices (and applications) complementing voice/video/textual communications necessitate and utilize additional information associated with each user (e.g. 230, 240). For example, a user's contact information may include his/her location, organizational status, alternative contacts, and similar information, which may be used by a another user to determine which communication mode to choose for a particular call, a timing of the call, or even an alternative contact to call.

All of the above described information may be gathered by presence server(s) 248 and maintained in an up-to-date fashion such that all subscribers of the UC service can have real time access to the information. The presence data can, of course, include much more information about each user such as their calendar information, their project team participations, and any other information maintained by the UC system. Thus, delivering updates on all users' presence information to a user may take considerable resources due to large amounts of data that may have to be provided. With client applications running on computing devices connected to the UCS through wired means, the delivery of presence updates may not be problematic due to relatively large bandwidths available for wired networks. Although, networks with significant number of users may still run into a challenge in updating presence information.

Mobile client applications communicating with a UCS, however, have three major challenges: limitation of the bandwidth (e.g. cellular network bandwidth), latency of information delivery, and power consumption at the mobile device due to receipt and processing of large amounts of data in a device typically powered by a battery or similar power source. To make matters worse, mobile client application may not always be connected to the mobile server 246 (e.g. due to cellular coverage disruptions) forcing the mobile server to store and send even larger amounts of data when the mobile client application is back online.

In a system according to embodiments, various approaches may be employed to minimize data traffic and, thereby, power consumption at the mobile device as well as latency. One of the techniques includes dynamic adjustment of optimum delay in exchanges between the mobile client application and the mobile server. Another technique includes filtering of portions of presence data that may not be crucial or even relevant to the mobile client application. Yet other techniques involve prioritization of cached presence information at the mobile server based on contacts of interest for the mobile user 230, activity status of mobile user 230, or activity status of other users (e.g. 240).

Embodiments are not limited to optimization of data traffic for presence information exchange. The approaches discussed below may be applied to any data exchange in a networked communication environment with limited resources such as bandwidth, power, and the like, using the principles described herein. Furthermore, cellular networks, as mentioned above, are provided as an example environment. Embodiments may be implemented in any networked communication environment.

Figure 3:
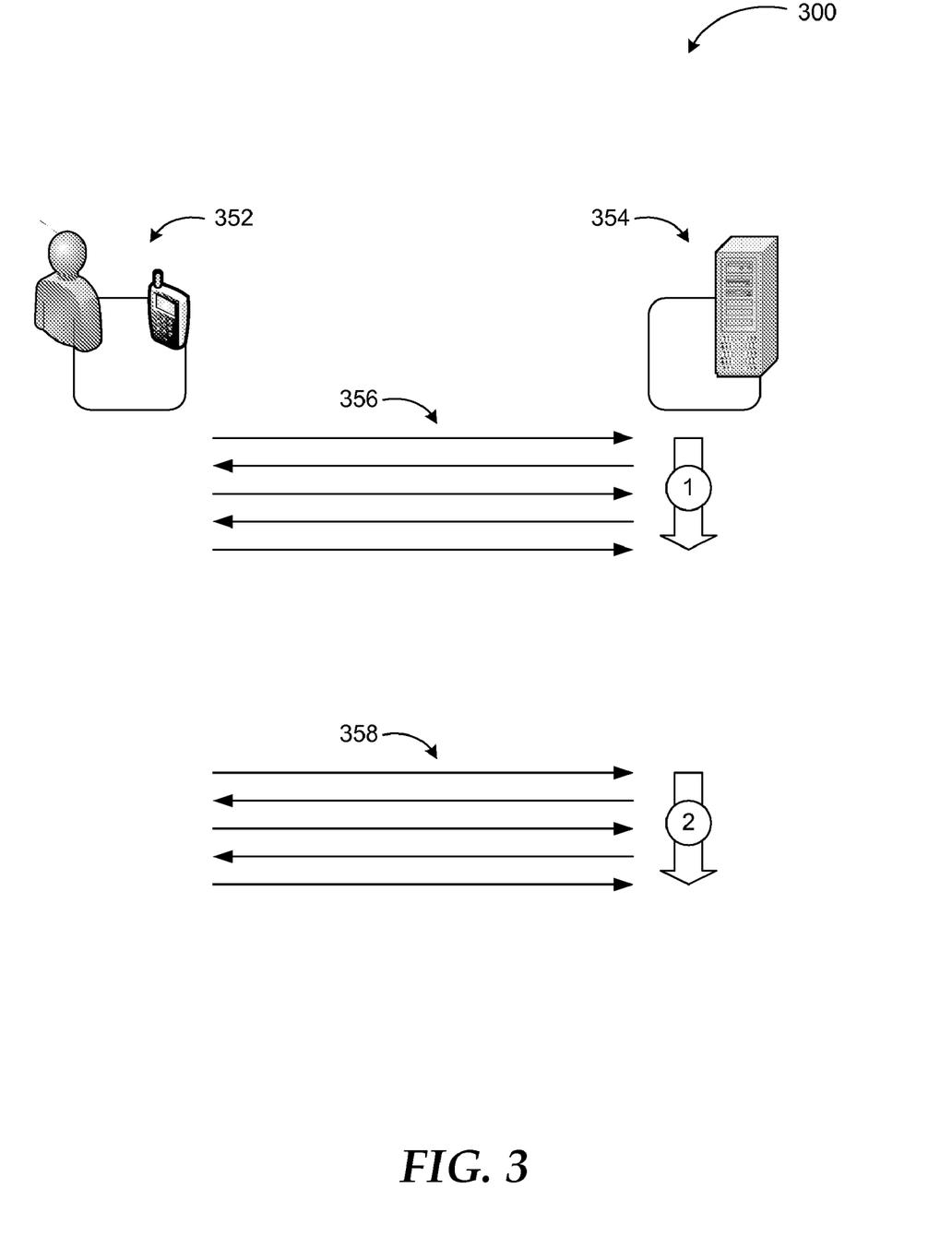
FIG. 3 is a conceptual diagram illustrating exchange of messages between a client application and a server to optimize delay between exchanges.

FIG. 3 is a conceptual diagram 300 illustrating exchange of messages between a client application and a server to optimize delay between exchanges. In a UC system, client application 352 maintains a heartbeat connection (e.g. HTTP) to the mobile server 354, referred to as the "Asynchronous (async) Channel". Client application 352 may open this connection and post a GET request for heartbeat or incoming notifications. The server may not immediately respond, but delay the response for a preset time period. This delay is called the "async response time". If the mobile server 354 gets an incoming call notification (voice call, video call, instant message, data/application sharing and similar) or a presence update, it may immediately send it to the mobile client application 352 as response. Otherwise, the mobile server 354 may send a heartbeat message. The client application 352 may then post a new request, and the cycle continues.

While maximizing the async response time is bound to minimize the data traffic between the client application and the mobile server related to maintaining the always-on connection, the async response time may not be arbitrarily large. A number of timeouts on the path from the client application to the mobile server determine how large the async response time can be. These timeouts may occur in the phone protocol stack, Network Address Translators (NATs) enroute, or an HTTP reverse proxy in the enterprise network.

According to some embodiments, the async response time may be dynamically determined optimizing data traffic in client application mobile server exchanges. The client application 352 starts out with a relatively short period (e.g. 30 seconds) and inform the mobile server of this value. If the client application receives a heartbeat response after this period, it may increase this period (e.g. double) and inform the mobile server 354 of the new value. If the client application 352 receives a heartbeat from the mobile server 354 at the end of this period, it may increase the value again. At some point, the selected value may exceed a threshold, and the client application observes that the connection times out and disconnects before a heartbeat is received from the mobile server. Upon detecting the timeout, the client application may roll down the async response value to the last successful value (e.g. in a binary search fashion). This exchange of messages dynamically adjusting the async response is shown by the arrows 356 in the figure between the client application 352 and mobile server 354. The two dimensional arrow "1" indicates an increase of the async response value with each exchanged message.

According to another embodiment, an optimum async response time value may be determined by starting out with a large timeout value. The initial value may be queried from the mobile server by the client application 352. If the connection times out using the initial async response value, client application 352 may query the mobile server 354 as to how long the last request lasted. Once the client application knows about the actual sustainable timeout value from the mobile server, it may use this as the heartbeat value as represented by the arrows 358 exchanged between the client application 352 and mobile server 354 with the two dimensional arrow "2" illustrating the decrease of async response value toward the optimum. The dynamic async response value adjustment may be applied by the client application whenever the mobile device connects to a new network and/or a new mobile server.

Figure 4:
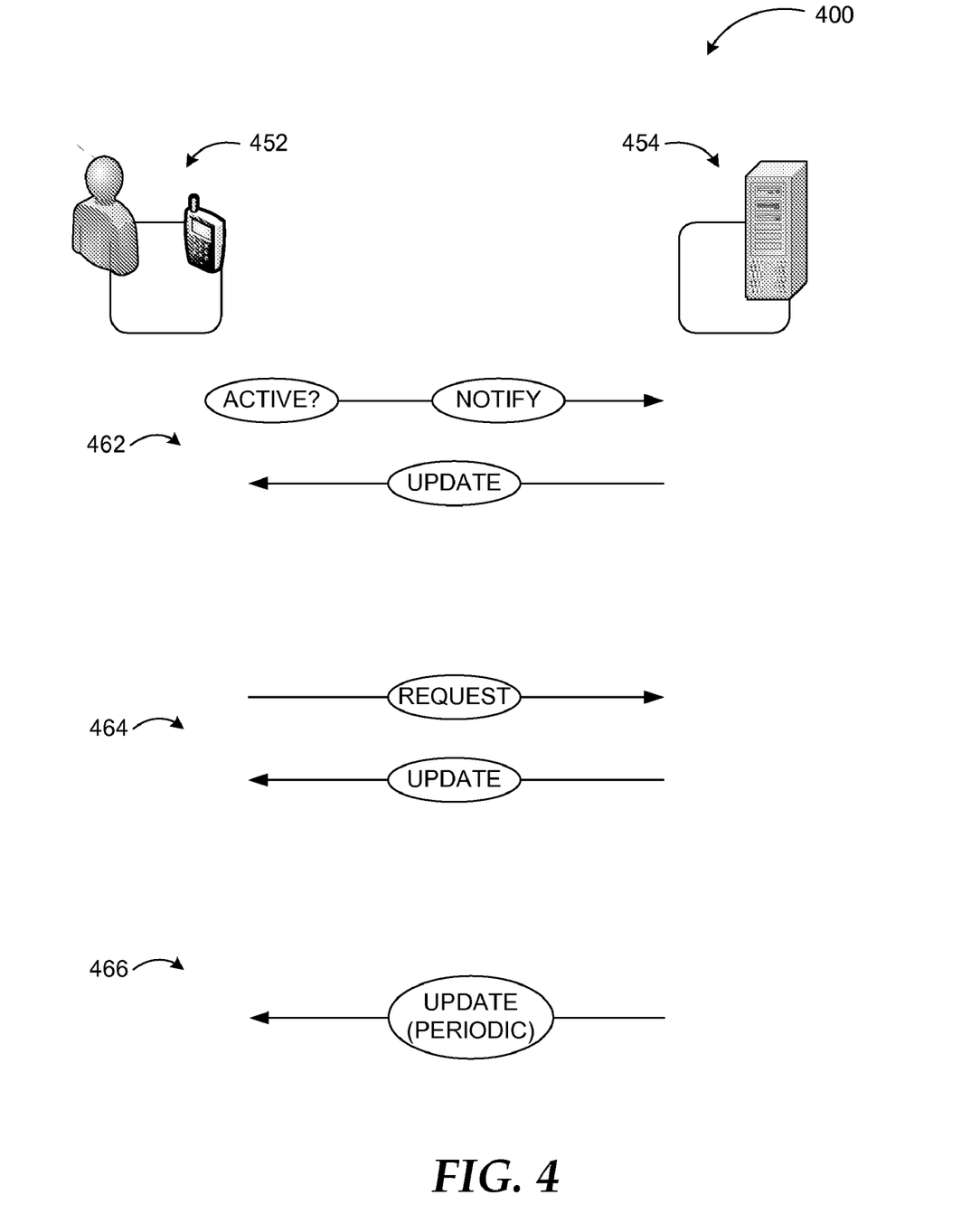
FIG. 4 is another conceptual diagram illustrating exchange of messages between a client application and a server to optimize delivery of updates to the client application based on user activity.

FIG. 4 is another conceptual diagram 400 illustrating exchange of messages between a client application and a server to optimize delivery of updates to the client application based on user activity. Although an "always-on" connection enables a mobile server to send presence updates immediately to a client application, such updates generate wireless data traffic and may result in excessive power consumption at the mobile device. Even though the mobile client application may have an "always-on" connection with the mobile server, the mobile user may not be actively using the client application resulting in wasted data traffic and power consumption.

According to further embodiments, a delivery of presence updates to the client application from the server may be dynamically controlled based on user activity. Mobile server 454 may cache presence updates and send only an indication of updates in the periodic heartbeat message that new updates are available. The client application 452 may monitor user activity at the mobile device. When activity is detected, client application 452 may send a request/notification to the server to immediately get the accumulated updates (462). Presence updates are thus not sent over the air when the mobile user is inactive. Since new presence updates relating to a same record overwrite any previous updates, only the latest presence updates need to be cached at the mobile server. Therefore, storage space and operations at the mobile server 454 do not need to be extensive while data traffic over the air is substantially reduced resulting in power consumption reduction at the mobile device as well.

Under certain circumstances, a mobile user may be interested in receiving presence updates immediately as they arrive at the mobile server 454. In that case, the client application 452 may send a request and receive the updates (464) overriding a default operation as described above. According to yet another embodiment, the mobile user may set a parameter at the client application 452, which in return communicates to the mobile server 454 to receive presence updates at a predefined (e.g. user defined) period.

Figure 5:
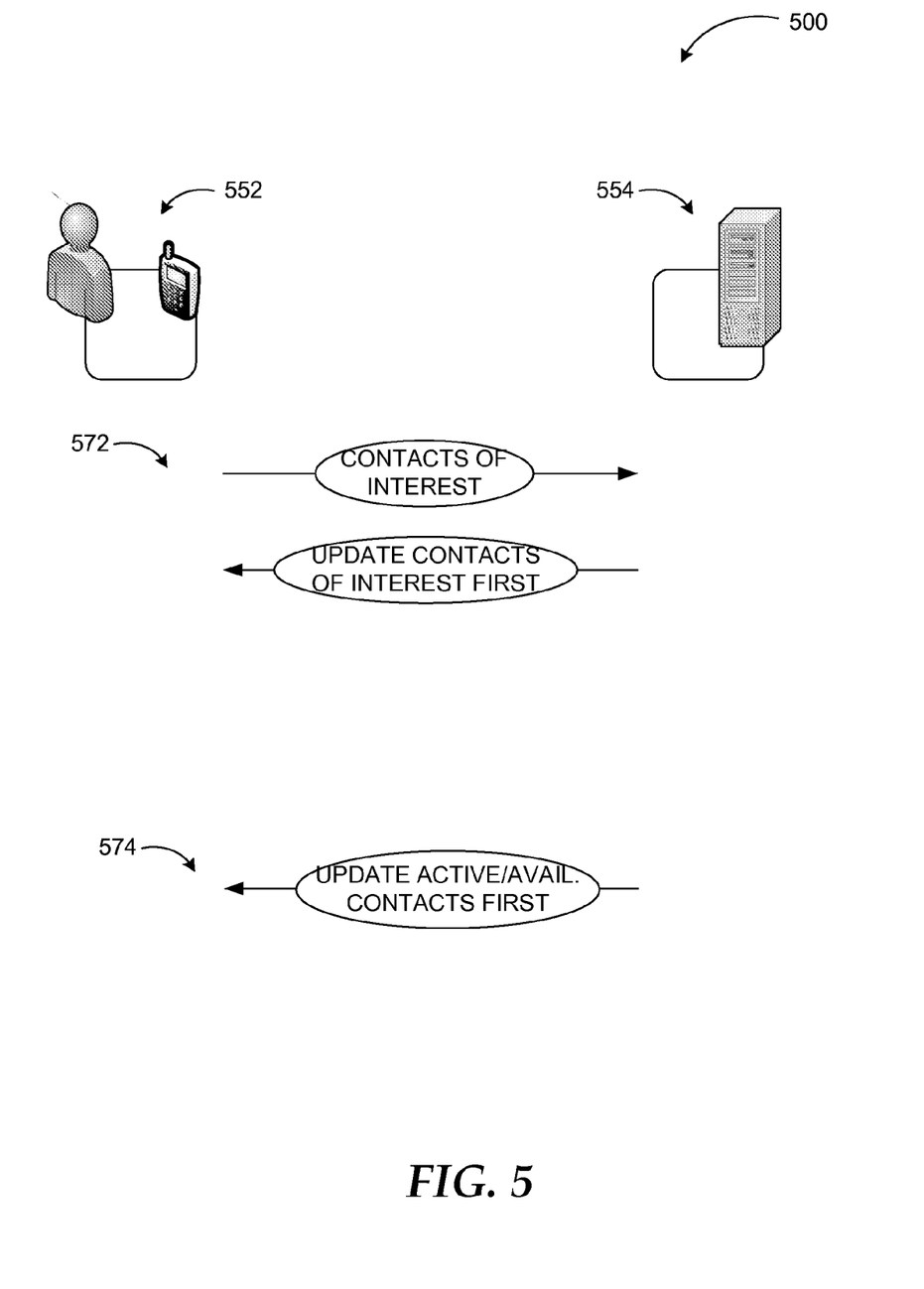
FIG. 5 is a further conceptual diagram illustrating exchange of messages between a client application and a server to optimize delivery of updates to the client application based on relevance.

FIG. 5 is a further conceptual diagram 500 illustrating exchange of messages between a client application and a server to optimize delivery of updates to the client application based on relevance. When cached presence updates are sent to the client application based on user activity, the information may not have been updated for a while and the user is likely to experience a delay before the latest information is downloaded from the server. A similar condition may occur when a client application is started and has to download presence information.

According to some embodiments, presence updates may be prioritized at the mobile server 554 based on status of corresponding contacts (e.g. availability). For example, the mobile server 554 may order the cached information and send the updates indicating an available status ("online", "busy", or similar) to the client application 552 first (574). The client application 552 in turn may provide a view to the user indicating only available contacts, which is updated first. The presence information of the other contacts may be marked as "unknown". Since the user can initiate meaningful communication (except for leaving a message, etc.) only with available contacts, the availability of this information first allows quick user action. The mobile server 554 meanwhile may update the presence status of unavailable contacts (e.g., those with status of "Away", "Do not disturb", "Offline", etc.) in the background reducing the latency in updating useful presence information at the client application.

According to other embodiments, the presence information may be updated for contacts that the user may actually be interested in (572). The contacts of interest may be determined directly from a favorite contacts list or similar grouping on the client side or through other means such as the client application 552 indicating to the mobile server 554 which screen the user is looking at, and the server sending the presence updates of contacts in the present and subsequent screens (depending on how many contacts are displayed on each screen). The user may also be enabled to scroll to a contact of interest, and the presence information retrieved pertaining to any contact the user pauses over for a predefined time (e.g. 2 seconds). This approach allows the user to look at the presence information for a specific contact he/she is interested in and reduces data traffic generated by presence updates significantly.

Yet another mechanism according to one embodiment enables the client application 552 to apply heuristics to determine which contacts the user might potentially be interested in. For example, the user is likely to be interested in contacts he/she has recently communicated with or most frequently communicated with, or with those he/she has an appointment that day. The client application 552 may then request presence updates for those contacts first from the mobile server 554. Similar operations may be performed at the mobile server upon receiving the input for the heuristics at the mobile server 554.

Figure 6:
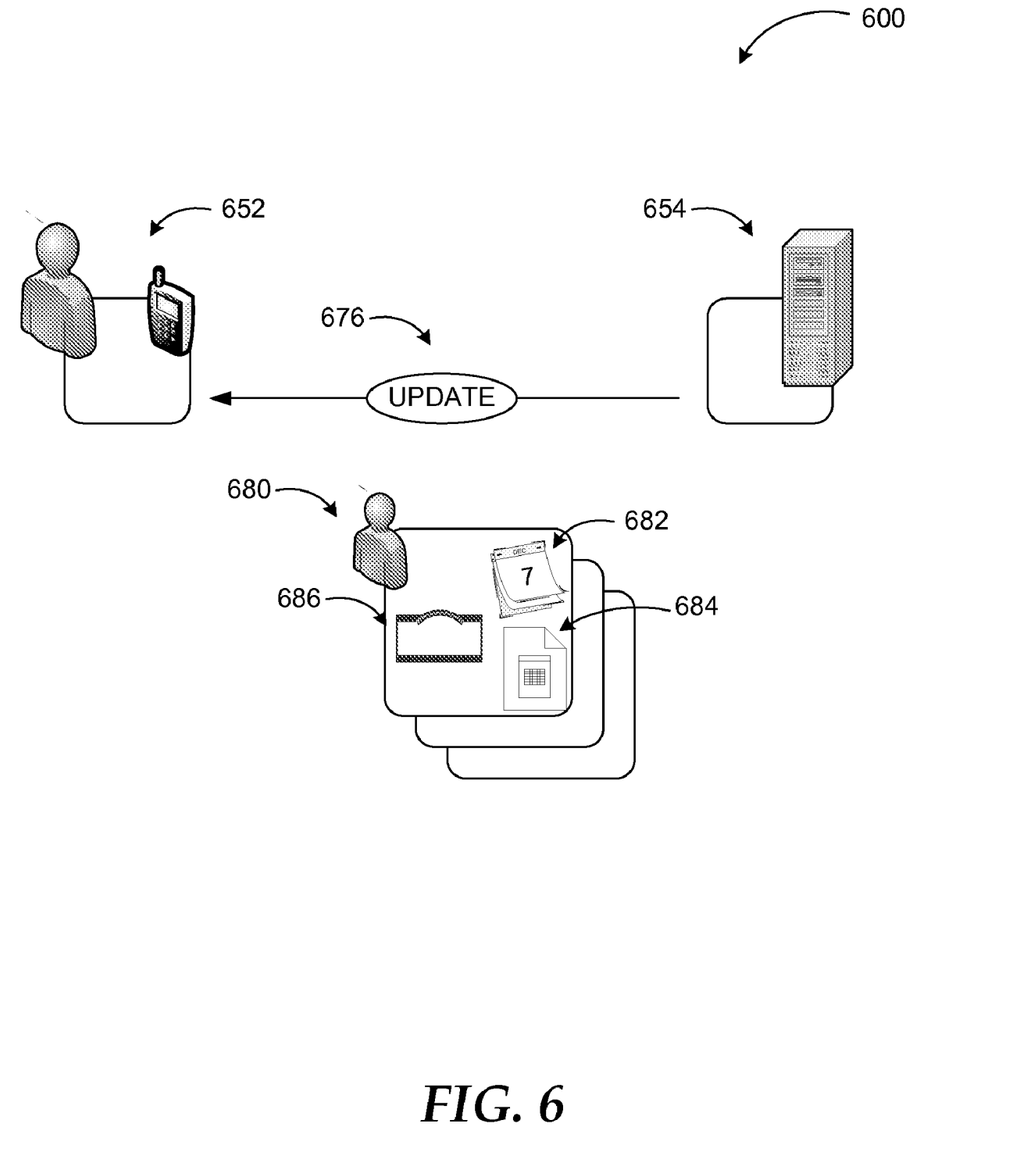
FIG. 6 is a yet another conceptual diagram illustrating delivery of update information to a client application based on filtering the update information at the server.

FIG. 6 is a yet another conceptual diagram illustrating delivery of update information to a client application based on filtering the update information at the server. A mobile server sends contacts information to a client application when the latter starts up. Typical contact information may include large amount of data, containing items such as a user's calendar information, office location, organization information, and comparable records. Making all of the available information associated with each contact may not be suitable for the mobile environment. Basic contact information (e.g. email address and phone numbers) and availability status are frequently used presence data, and sending only this portion of presence data for a contact may further optimize data traffic, latency, as well as power consumption at the mobile device.

According to one embodiment, mobile server 654 may filter non-essential portions of presence information associated with contact 680 such as calendar information 682 and organization information 684 before sending the essential portions such as contact addresses 686 to the client application 652 in update 676. The mobile user may be enabled to request the full information for a specific contact at any time. The client application 652 may then send a request to the mobile server 654 to fetch the remaining information. Filtering may be based on user defined configuration, a default set of rules, or through some heuristic method such as the one described above.

The above discussed scenarios and example systems focus on delivery of presence updates to mobile client applications. Embodiments are not restricted to presence data exchange, however. Any data provided from a mobile device management server to applications on networked mobile devices may be processed in a similar manner using the principles described herein. Furthermore, the tasks described above are intended for illustration purposes. Some of the tasks may be performed by the client application or by the mobile server and vice versa.

Figure 7:
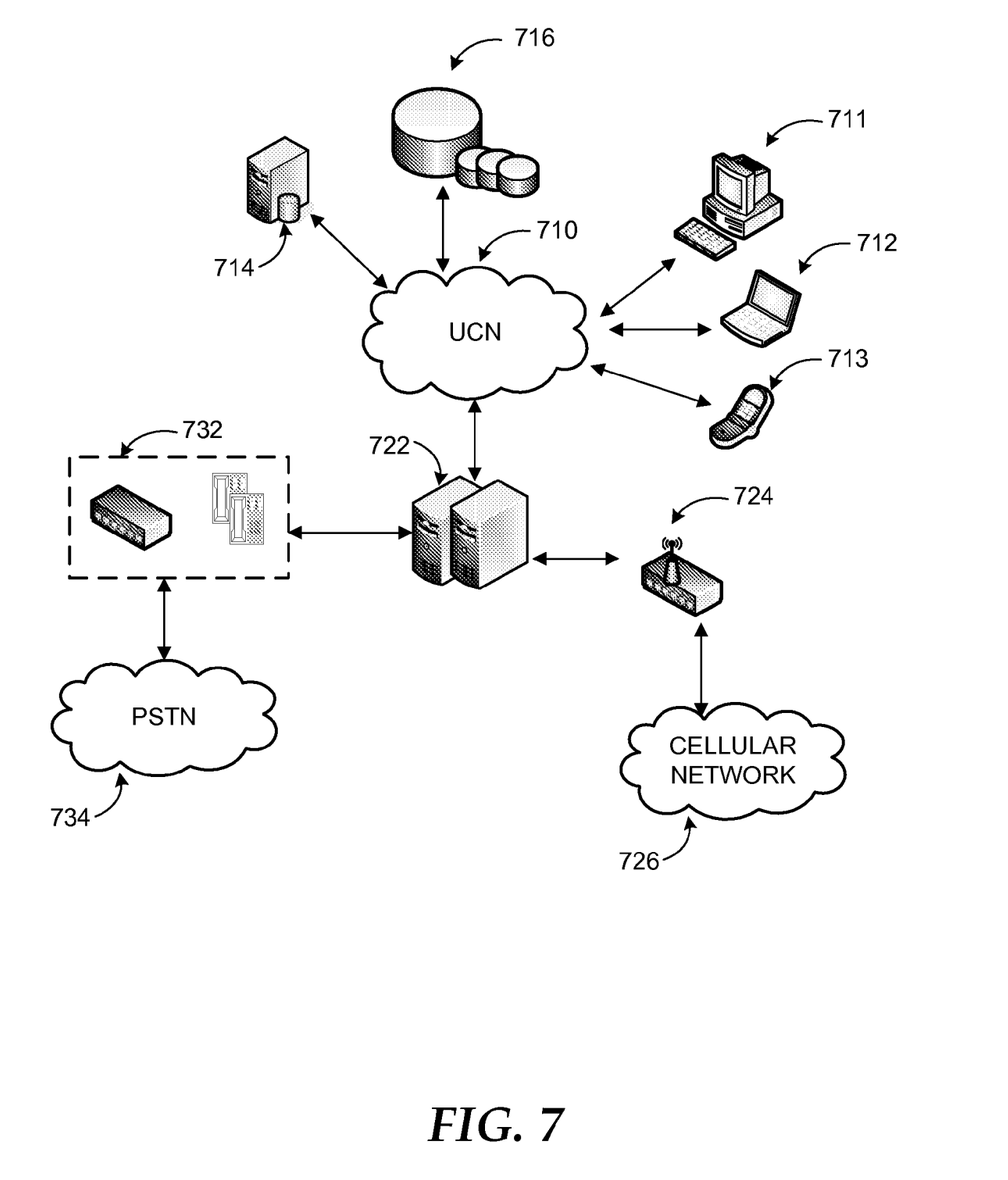
FIG. 7 is a networked environment, where a system according to embodiments may be implemented.

FIG. 7 is an example networked environment, where embodiments may be implemented. A platform providing unified communication services may be implemented via software executed over one or more servers 722 such as a hosted service. The platform may communicate with client applications on individual computing devices such as a cellular phone 713, a laptop computer 712, and desktop computer 711 (client devices) through network(s) 710.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, white-boarding, and similar modes, may be available depending on the capabilities of each device and applications available on each device. Subscribers are also provided presence information including location, contact information, alternative contacts, availability status, calendar information, and similar data that may be used in determining whether or not to initiate communication with a subscriber, which mode of communication, and similar decisions.

As discussed previously, client devices 711-713 are used to facilitate communications through a variety of modes between subscribers of the UC service. Presence information and other data is provided to the client applications even when no communication is taking place between two or more client devices. Thus, a mobile server, which may be one of the servers 722, may employ the data traffic optimization techniques discussed above reducing latency and power consumption by client applications being executed on battery powered mobile devices such as cellular phone 713. Information associated with subscribers and facilitating communications such as presence information may be stored in one or more data stores (e.g. data store 716), which may be managed by any one of the servers 722 or by database server 714.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN 734 and cellular network 726. Specialized devices and systems such as RF modem 724 and PBX 732 may be used to facilitate communication with such other networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a system for optimizing data traffic and power consumption in mobile communication devices. Furthermore, the networked environments discussed in FIG. 7 are for illustration purposes only. Embodiments are not limited to the example applications, modules, or processes.

Figure 8:
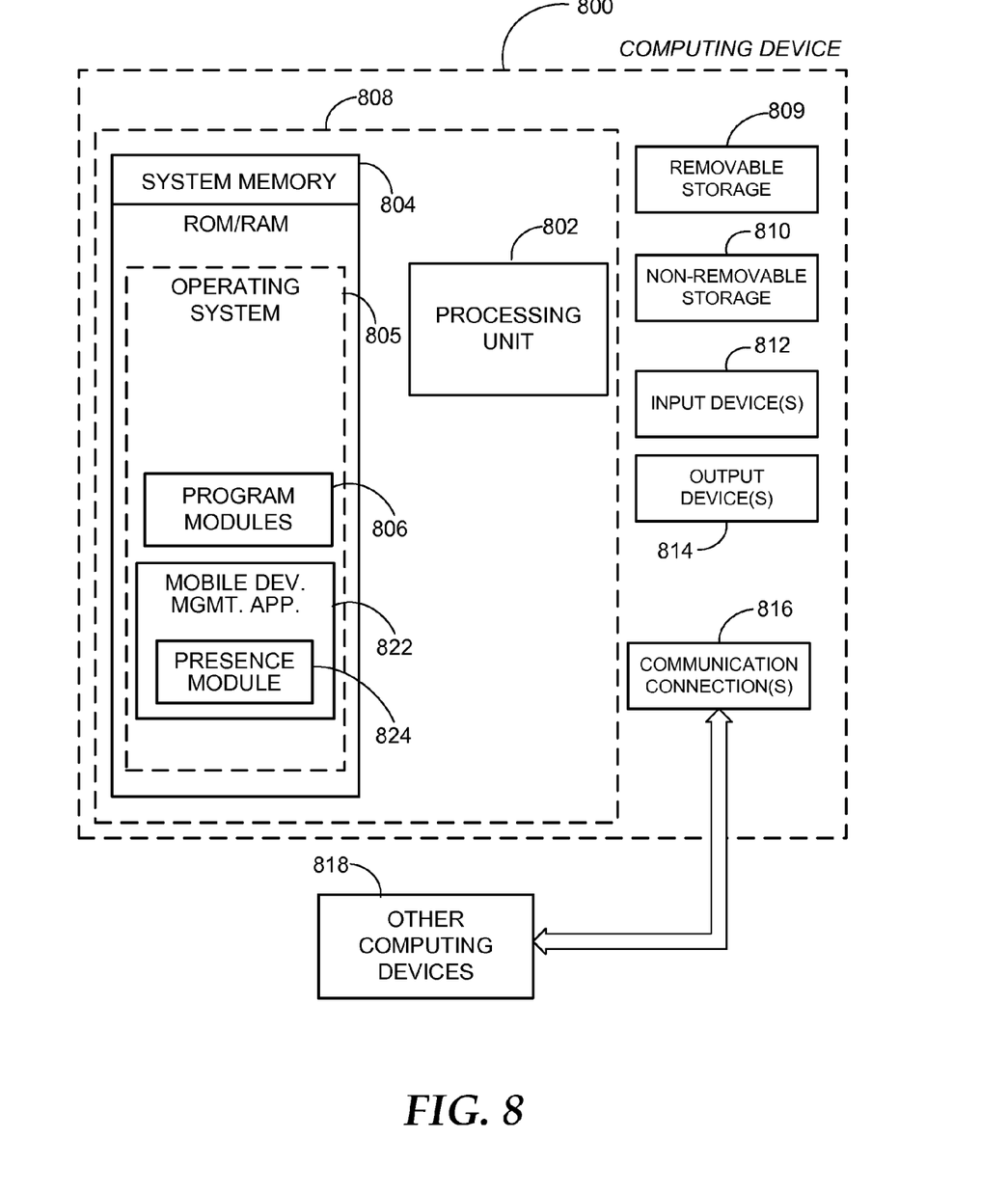
FIG. 8 is a block diagram of an example computing operating environment, where a mobile server functionality according to embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a mobile server in a UC system and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, mobile device management application 822, and presence module 824.

Mobile device management application 822 and presence module 824 may be separate applications or integral modules of a hosted service that provides enhanced communication services to client applications/devices. Presence module 824 may receive presence information from a number of subscribers associated with the UC system, cache the received data, and provide to a requesting client application employing the optimization mechanisms described previously. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, GPS satellites providing GPS data, cellular towers providing external data, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
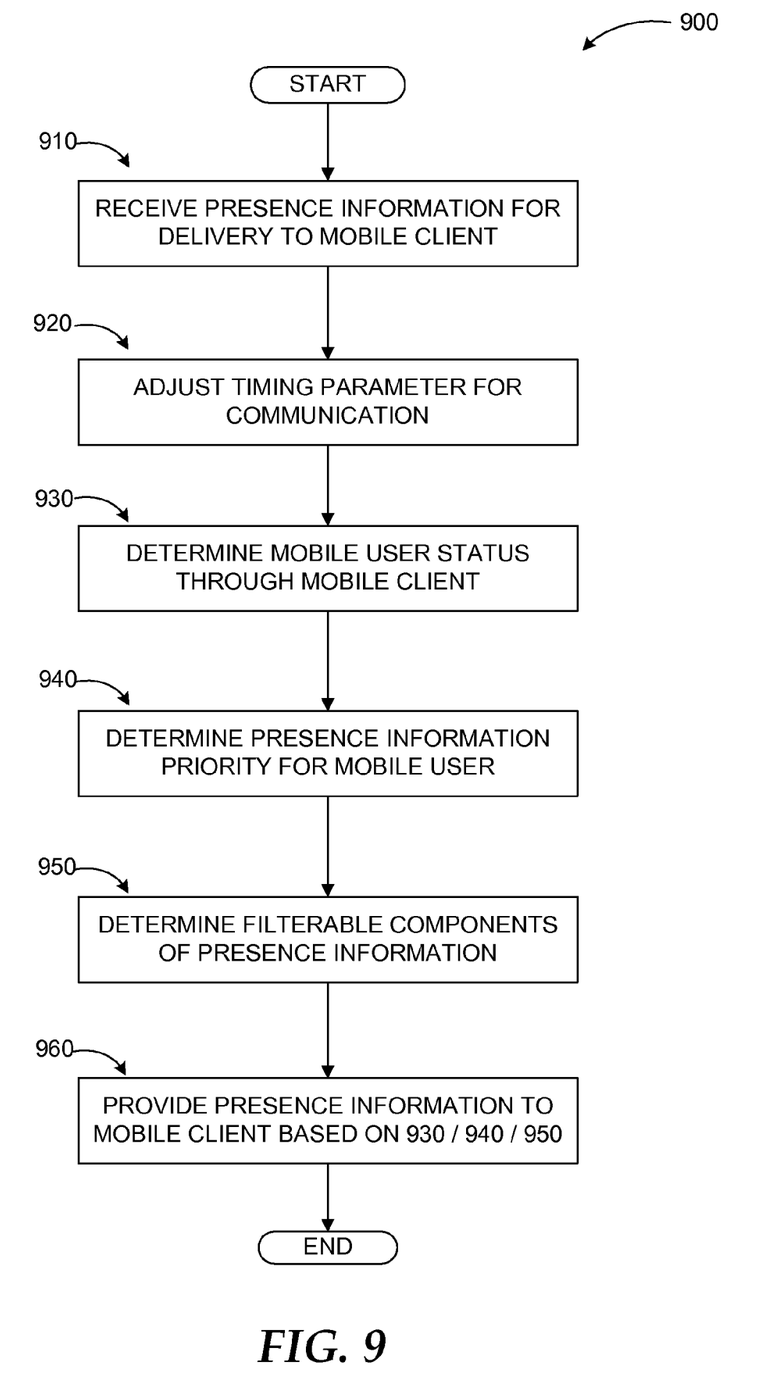
FIG. 9 illustrates a logic flow diagram for optimizing mobile communication for data traffic and power consumption at the mobile device according to embodiments.

FIG. 9 illustrates a logic flow diagram 900 for optimizing mobile communication for data traffic and power consumption at the mobile device according to embodiments. Process 900 may be implemented at a mobile server as part of a unified communication system such as the one described above in conjunction with FIG. 2.

Process 900 begins with operation 910, where presence information (and/or other data) is received for delivery to a mobile client application at the mobile application management server. The data may be cached and processed as described in the subsequent operations prior to delivery to the mobile client application. Processing proceeds to operation 920 from operation 910.

At operation 920, a timing parameter such as an async response timeout value may be adjusted as discussed in conjunction with FIG. 3. The adjustment may be performed in an iterative manner through exchange of messages between the client and the server increasing a low initial value or decreasing a high initial value depending on a comparison of the used value with an actual timeout of the system.

At operation 930 following operation 920, an activity status of the mobile user is determined through the mobile client application. As discussed previously, the server may hold off providing updates to the client application if the mobile user is inactive.

At operation 940, the information cached by the server is prioritized. The prioritization may be based on direct mobile user preferences, indirect inferences based on mobile user activity, or heuristic algorithms detecting mobile user interest in particular portions of the cached data such as presence information of specific contacts. Prioritization may be performed at the client application or at the server with the client application providing raw data needed for the determination.

At operation 950, filterable components of the cached data (presence information) are determined. As discussed previously, some portions of the data (e.g. calendar information in presence data) may not be relevant in a mobile application environment. Filtering out such portions reduces data traffic and, thereby, power consumption on the mobile application side.

At operation 960, cached data (e.g. presence information) is provided to the mobile client application employing one or more of the optimization techniques described in operations 930, 940, and 950.

The operations included in process 900 are for illustration purposes. Optimizing data traffic and power consumption in mobile communication devices may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for optimizing data traffic between a mobile application and a server in a communication network, the method comprising:
    dynamically adjusting a delay value associated with exchange of messages between the mobile application and the server, the messages including data provided by the server;
    upon detecting a timeout, reducing the delay value to a last successful delay value in a binary search fashion;
    receiving data to be delivered to the mobile application at the server;
    storing the received data;
    prioritizing the stored data based on at least one from a set of: a mobile application user status, a category of the data, and a status of a source of the data; and
    providing the stored data to the mobile application based on the prioritization.

2. The method of claim 1, wherein dynamically adjusting the delay value includes:
    receiving a first delay value from the mobile application;
    if no new data is to be provided at the end of the first delay value, receiving a second delay value that is greater than the first delay value; and
    continuing to receive increased delay values until one of: new data is to be provided before the end of a received delay value and a system communication timeout occurs.

3. The method of claim 1, wherein dynamically adjusting the delay value includes:
    receiving a first delay value from the mobile application;
    receiving a query from the mobile application for an elapsed time until a timeout; and
    providing the mobile application the elapsed time until the timeout such that the mobile application is enabled to use the elapsed time until the timeout as delay value for the exchange of messages until another timeout occurs.

4. The method of claim 1, wherein the received data is cached at the server such that older versions of the data are overwritten.

5. The method of claim 1, wherein prioritizing the stored data based on mobile application user status includes:
    when new data is available for delivery to the mobile application, providing an indication of available new data to the mobile application;
    in response to a request from the mobile application indicating one of: the user being active, the user indicating a request for new data, and expiration of a user defined time period, providing the new data to the mobile application.

6. The method of claim 1, wherein the received data is presence data associated with users of the communication network.

7. The method of claim 6, wherein prioritizing the stored data based on status of the source of data includes:
    determining a presence status of the users of the communication network; and
    prioritizing the data associated with users who are available for communication such that data associated with users who are not available for communication is provided to the mobile application only upon request.

8. The method of claim 6, wherein prioritizing the stored data based on a category of the data includes:
    determining users of the communication network of interest to the mobile application user; and
    prioritizing the data associated with the users of the communication network of interest to the mobile application user for delivery to the mobile application.

9. The method of claim 8, wherein determining the users of the communication network of interest to the mobile application user includes at least one of: retrieving a favorite contacts list and receiving an indication from the mobile application user.

10. The method of claim 8, wherein determining the users of the communication network of interest to the mobile application user includes employing a heuristic algorithm based on at least one of: a recently contacted users list, a scheduled appointments list, and a received calls list.

11. The method of claim 6, further comprising:
    determining a portion of the presence data that is not relevant to the mobile application; and
    filtering the irrelevant portion of the data prior to providing the data to the mobile application.

12. A mobile server for optimizing data traffic between a mobile application and a unified communication network, the mobile server comprising:
    a memory for storing computer-executable instructions;
    a processor coupled to the memory, the processor configured to execute instructions to cause actions including:
    dynamically determine a timing of message exchanges between the mobile server and the mobile application based on an iterative adjustment of a delay value and a system timeout;
    upon detecting a timeout, reduce the delay value to a last successful delay value in a binary search fashion;
    cache presence data received from subscribers of the unified communication network;
    prioritize the cached presence data based on at least one from a set of:
    whether a subscriber associated with the mobile application is active,
    whether a portion of the cached presence data is of interest to the subscriber associated with the mobile application, and
    whether the cached presence data is associated with an available subscriber; and
    provide at least a portion of the cached presence data to the mobile application based on the prioritization.

13. The mobile server of claim 12, wherein the processor is further configured to determine the timing of the message exchanges by one of increasing and decreasing an initial delay value provided by the mobile application based on occurrence of a timeout during a current delay period.

14. The mobile server of claim 12, wherein the processor is further configured to:
    receive from the mobile application a plurality of contacts of interest to the subscriber associated with the mobile application; and
    determine the portion of cached presence data of interest to the subscriber based on the plurality of contacts, wherein the plurality of contacts is determined from one of: a favorite contacts list, a selection by the subscriber from a complete contacts list, and from a computation employing a heuristic algorithm based on communication activities.

15. The mobile server of claim 12, wherein cached presence data associated with unavailable subscribers of the unified communication network is de-prioritized and provided to the mobile application only upon explicit request.

16. The mobile server of claim 12, wherein the mobile server is configured to receive updates to the cached presence data upon changes to a presence of each subscriber of the unified communication network, and wherein only a portion of the cached data associated with availability and contact information of contacts of interest to the subscriber associated with the mobile application is provided to the mobile application.

17. A system for optimizing data traffic between a mobile application and a mobile server in a unified communication network, the system comprising:
    a mobile device for executing the mobile application and for communicating with the mobile server and other communication devices over a cellular network, wherein the mobile application is configured to:
    provide an iteratively adjusted delay value to the mobile server during an "always-on" connection to dynamically determine an optimum timing for exchange of messages between the mobile application and the mobile server;
    upon detecting a timeout, reduce the delay value to a last successful delay value in a binary search fashion;
    determine a list of contacts of interest through one of: subscriber selection and heuristic computation; and
    provide to the mobile server the list of contacts of interest and an activity status of the subscriber; and
    the mobile server configured to:
    cache presence data received from other subscribers of the unified communication network;
    determine a portion of the cached presence data based on the list of contacts of interest to the subscriber and an activity status of the contacts on the list;
    provide the portion of the cached presence data to the mobile application.

18. The system of claim 17, wherein the mobile application is configured to facilitate communication in a selected communication mode over the cellular network utilizing the presence information received from the mobile server.

19. The system of claim 18, wherein the mobile application is further configured to enable the subscriber to:
    define a period for delivery of cached presence data from the mobile server regardless of an activity status of the subscriber;
    request an immediate delivery of cached presence data from the mobile server regardless of an activity status of the subscriber; and
    define a relevant portion of the cached presence data for delivery from the mobile server to the mobile application.

20. The system of claim 18, wherein the mobile application and the mobile server are configured to communicate employing one of HTTP and HTTPS, and wherein the mobile server is further configured to communicate with other servers within the unified communication network employing Session Initiation Protocol (SIP).

* * * * *